United States Patent [19]

Conrad et al.

[11] Patent Number: 4,653,192
[45] Date of Patent: Mar. 31, 1987

[54] SEGMENT HEIGHT MEASURING DEVICE

[76] Inventors: Kenneth R. Conrad, 2524 Timberwyck Trail; Rudolph S. De Mercurio, 2564 Red Fox Trail, both of Troy, Mich. 48098

[21] Appl. No.: 844,309

[22] Filed: Mar. 26, 1986

[51] Int. Cl.⁴ ............................................. A61B 3/10
[52] U.S. Cl. ...................................... 33/200; 351/204
[58] Field of Search .................. 33/200, 507; 351/204

[56] References Cited

U.S. PATENT DOCUMENTS

| | | | |
|---|---|---|---|
| 1,675,407 | 7/1928 | Dvorine | 33/200 |
| 1,981,438 | 11/1934 | Smith | 33/200 |
| 1,981,439 | 11/1934 | Smith | 33/200 |
| 2,491,312 | 12/1949 | Henry et al. | 33/200 |
| 2,632,257 | 3/1953 | Belgard | 33/200 |
| 2,884,702 | 5/1959 | Engelmann | 33/200 |
| 3,740,857 | 6/1973 | Nerad | 33/200 |
| 3,987,554 | 10/1976 | Pastore | 33/200 |
| 4,167,067 | 9/1979 | Guiset | 33/200 |
| 4,252,419 | 2/1981 | Padula, II et al. | 33/200 |
| 4,368,958 | 1/1983 | Buget | 33/200 |
| 4,494,837 | 1/1985 | Bommarito | 351/204 |
| 4,531,297 | 7/1985 | Stoerr | 33/200 |

Primary Examiner—Richard R. Stearns
Attorney, Agent, or Firm—Harness, Dickey & Pierce

[57] ABSTRACT

There is disclosed herein an improved apparatus for use in accurately determining the proper position for the line of demarcation between the bifocal correction lens and other corrective lens segments to be provided in eyeglass lenses. The measuring apparatus includes an elongated indicia carrying member having provided thereon adjustable clamping members specifically designed to enable the elongated member to be attached to a wide variety of eyeglass frames for purposes of obtaining a measurement of the proper height for location of the segment line. The elongated member also includes a sliding gauge which may be moved therealong and cooperates with the indicia to provide an accurate, easily determined measurement for the position of the segment line.

13 Claims, 10 Drawing Figures

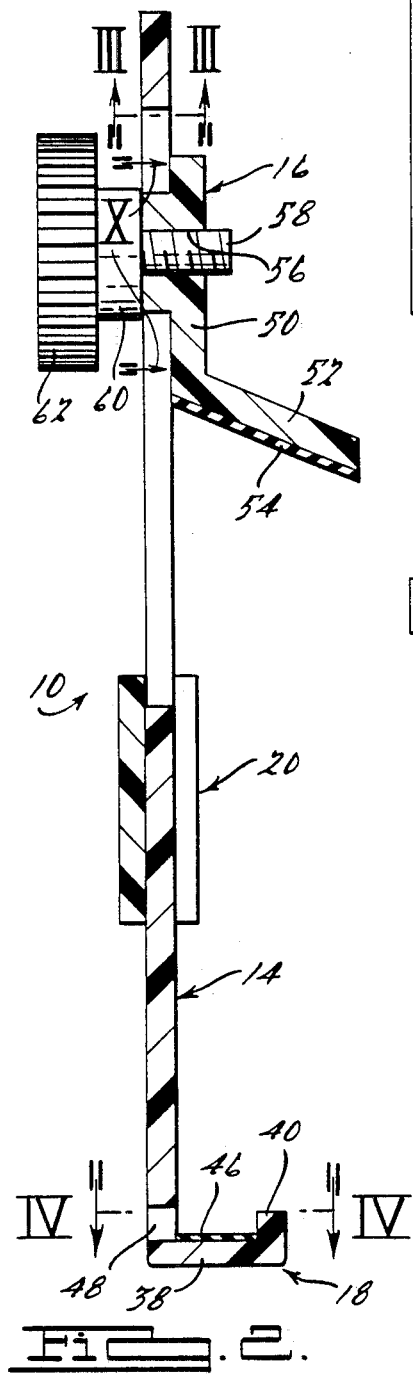
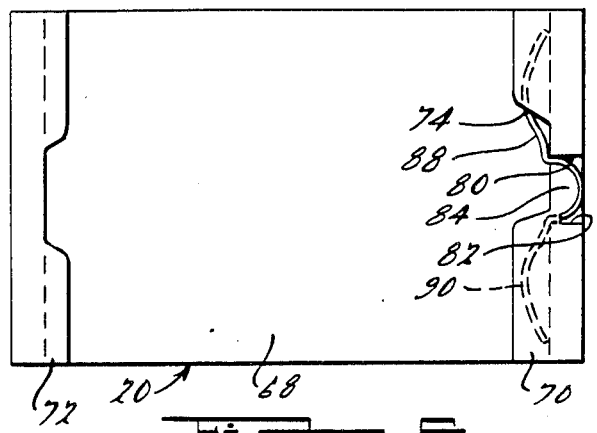
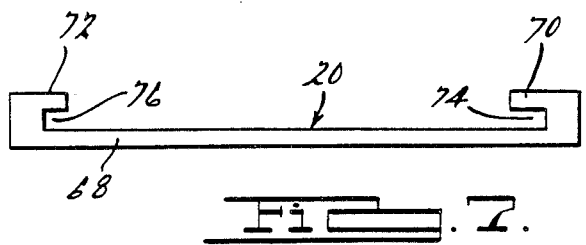
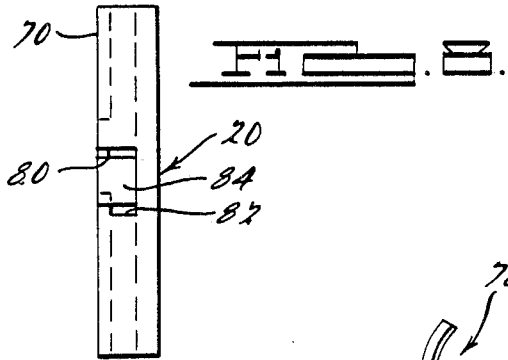
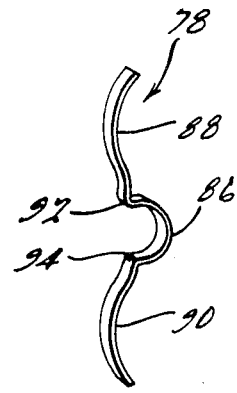

SEGMENT HEIGHT MEASURING DEVICE

BACKGROUND OF THE INVENTION

The present invention relates generally to eye testing apparatus and more particularly to devices for accurately determining the proper height for bifocal segment lines.

When corrective lenses are to be provided with bifocal segments, it is extremely critical to the satisfactory performance of such eyeglasses that the segment height be properly positioned with respect to the corrective lenses such that both the bifocal segment and other portion of the corrective lenses will be located in proper relationship to the user's line of vision. As may be presumed, it is very important that this measurement be accomplished while the user is wearing the eyeglasses as the relative positioning of this segment line with respect to the user's eyes is of critical importance. This measurement problem is further compounded by the fact that present day eyeglass frames take a wide variety of shapes and sizes ranging from generally circular in shape to various oval configurations. Additionally, any such measuring apparatus should also be capable of accommodating the so-called frameless eyeglasses as well as wire rim frames, etc.

While various devices have been developed over the years for use in determining this measurement, none of these devices have proved to be totally acceptable. Many of these devices are difficult and/or complicated to use thus requiring substantial amounts of time be expended in obtaining the desired measurement. Others of these devices do not tend to be sufficiently accurate or may result in movement of the eyeglass frames during a critical portion of the measuring process. Still other devices may be extremey well suited for use with a particularly shaped frame member but may be virtually unusable with respect to other different shaped frame members.

Accordingly, the present invention provides a segment height measuring device which overcomes the problems heretofore encountered with such devices. The segment height measuring device of the present invention is designed to be fabricated from lightweight transparent plastic and is provided with clamp means which may be adjustably fitted to virtually any shape frame member. The apparatus includes a sliding member which is preferably fabricated from a transparent colored plastic so as to distinguish its location from the otherwise clear measuring device upon which is imprinted appropriate indicia. Thus, by merely moving the slide member into the appropriate position, the coloring thereon will provide a clear indication of its location to the wearer of the eyeglasses thus assisting in obtaining the proper measurement for the segment height line. The ophthalmologist or optometrist need thereafter merely read the correct positioning from the indicia scale provided on the member and will then be assured that the lens manufacturer will be able to accurately position the segment height line.

Additional advantages and features of the present invention will become apparent from the subsequent description and the appended claims taken in conjunction with the accompanying drawings.

BRIEF DESCRIPTION OF THE DRAWINGS

FIG. 2 is a longitudinal section view of the segment height measuring device shown in FIG. 1, the section being taken along line II—II thereof;

FIG. 6 is an elevational view of the slide member forming a part of the segment height measuring device in accordance with the present invention;

FIG. 7 is a plan view of the slide member illustrated in FIG. 6;

FIG. 8 is an end view of the slide member shown in FIG. 6;

FIG. 9 is a perspective view of a spring member incorporated in the slide member illustrated in FIG. 6.

DESCRIPTION OF THE PREFERRED EMBODIMENT

Figure 1:
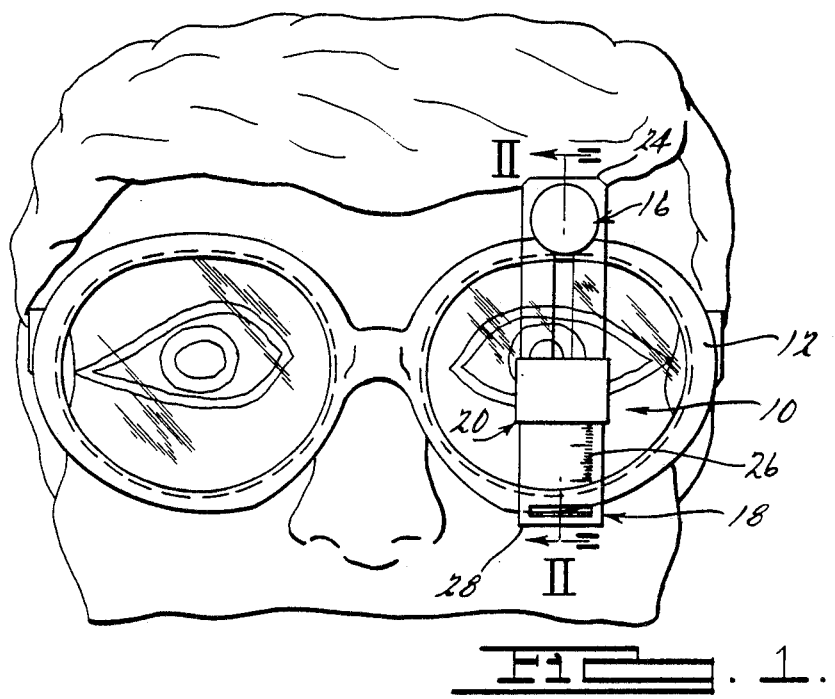
FIG. 1 is a front elevational view illustrating an individual being fitted with a pair of eyeglasses with the segment height measuring device in accordance with the present invention shown in operative relationship thereto.
Figure 3:
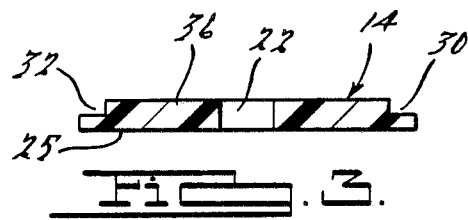
FIG. 3 is a section view of the segment height measuring device shown in FIG. 2, the section being taken along line III—III thereof.

Referring now to the drawings and in particular to FIG. 1 thereof, there is shown a segment height measuring device 10 in accordance with the present invention illustrated in operative relationship to a pair of eyeglasses 12 shown suitably positioned on a wearer thereof. As shown therein, the segment height measuring device 10 comprises an elongated generally vertically extending (as shown) member 14 having associated therewith upper and lower clamping means 16 and 18 and a slide member 20 movably supported thereon intermediate the ends thereof.

As best seen with reference to FIGS. 1 and 2, the elongated member 14 will preferably be formed from a suitable transparent, clear plastic material so as to enable an individual being fitted with eyeglasses to see therethrough relatively easily and clearly. An elongated slot 22 is provided extending longitudinally along approximately the midline of elongated member 14 from adjacent one end 24 thereof to a location slightly beyond the midpoint. Additionally, the front face 25 of the elongated member will be provided with suitable indicia 26 along one side thereof extending from a position closely adjacent the lower edge 28 thereof upwardly over a suitable portion of the length thereof. Preferably, this indicia will be in the form of metric measurements (such as millimeters). A pair of substantially identical recesses or channels 30 and 32 are provided on elongated member 14 extending from adjacent the lower end 28 thereof along laterally opposite edges thereof and opening outwardly at the upper end 24 thereof. As shown, recesses or channels 30 and 32 are provided on the rear surface 36 of elongated member and have a depth approximately equal to one-half the thickness thereof.

Figure 4:
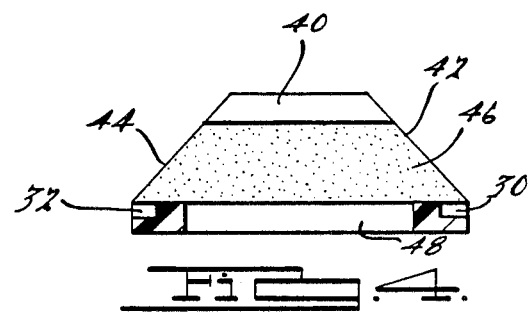
FIG. 4 is a section view of the segment height measuring device of FIG. 2, the section being taken along line IV—IV thereof.
Figure 5:
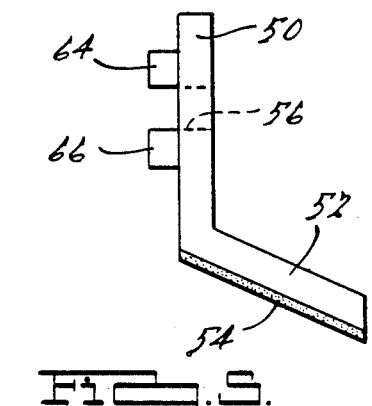
FIG. 5 is a side view of the upper clamping member forming a part of the segment height measuring device shown in FIG. 2.

The lower end 28 of elongated member 14 includes a relatively short rearwardly extending flange portion 38 extending outwardly in substantially perpendicular relationship to surface 36 and terminating in a generally upwardly extending leg section 40 which together operate to define a lower clamping surface therefor. As best seen with reference to FIG. 4, the opposite lateral edge surfaces 42 and 44 of flange portion 38 and leg 40 are positioned so as to converge in a direction extending away from surface 36 of elongated member 14 so as to facilitate forming thereof by use of relatively uncomplicated dies. Preferaby, a suitable friction enhancing surface 46 will be provided on the upwardly facing surface portion of laterally extending flange portion 38 so as to facilitate non-slipping engagement with the lower portion of the eyeglass frames or lenses with which it is to be utilized. It should be noted that the converging taper of the opposite lateral edges 42, 44 of this lower clamping portion 18 are provided so as to facilitate formation of elongated member 14 by suitable means such as injection forming apparatus utilizing relatively uncomplicated dies. A relatively small laterally elongated opening 48 is also provided in the elongated member 14 immediately adjacent the laterally extending flange portion 38 and operates to also facilitate forming of elongated member 14 as a single piece.

An upper clamping member 16 is also provided being movably supported on the elongated member 14 and comprises a first flange portion 50 positioned in substantially parallel relationship to the elongated member 14 and having a clamping flange portion 52 extending outwardly therefrom at an angle thereto. Preferably, the clamping flange portion 52 will extend at an included angle slightly in excess of 90° so as to inhibit the possibility of the segment height measuring device 10 slipping off from the eyeglass frames once it has been fitted thereto. The lower surfsace of this clamping flange portion 52 is also similarly provided with a suitable friction enhancing surface 54 to further aid in creating a non-slipping engagement with the eyeglass frames.

Flange portion 50 has a threaded opening 56 provided therein which is designed to receive a threaded stud 58 extending through the slot 22 provided in the elongated member 14. The threaded stud has an enlarged portion 60 designed to abuttingly engage the front surface 25 of the elongated member 14 immediately adjacent the elongated slot 22 so as to enable the upper clamping member 16 to be clamped in any suitable position therealong. In order to facilitate repositioning of this upper clamping member 16, a suitably knurled thumb screw portion 62 is also provided on the outer end of threaded stud 58.

Figure 10:
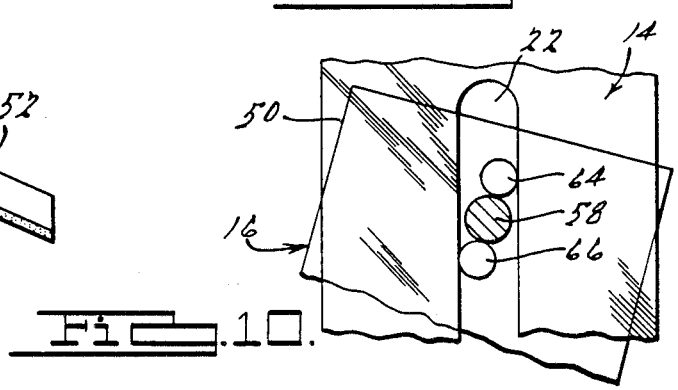
FIG. 10 is a fragmentary section view of the segment height measuring device in accordance with a present invention, the section being taken along line X—X of FIG. 2.

A pair of generally cylindrically shaped tab members 64 and 66 are provided on flange portion 50 immediately above and below the threaded opening provided therein. Preferably these cylindrically shaped tab members 64 and 66 will be of a diameter slightly less than the width of the elongated slot 22 so as to allow slight pivotal movement of upper clamping member 16 about threaded stud 58 such as best seen with reference to FIG. 10. It is preferred that a slight pivotal movement of upper clamping member 16 with respect to member 14 in an of amount approximately 15° be provided so as to enable the upper clamping member to accommodate various shapes and curvatures which may be present along the upper edge of eyeglass frames with which it is to be utilized. Also, preferably tab members 64 and 66 will be of a length slightly less than the thickness of the elongated member 14 so as to avoid the possible interference with the clamping action provided by the threaded stud 58. Thus it will be appreciated that the upper and lower tab members 64, 66 will cooperate to allow the upper clamping member 16 to pivot slightly with respect to slot 22 while it is being adjusted so as to assure a secure clamping engagement with the upper portion of the eyeglass frames.

Referring now to FIGS. 6 through 9, slide member 20 which is also movably supported on the elongated member 14 is illustrated and cooperates with the indicia 26 provided thereon to provide a measurement for the proper positioning of the segment height line. Preferably, slide member 20 will also be fabricated from a suitable transparent plastic material, however, it is preferable to provide a contrasting color to the material thereof so as to apprise the person being fitted with eyeglasses of the location at which the segment height line will ultimately be positioned in the finished lenses. The slide member 20 is generally rectangular in shape and includes a front wall portion 68 having a width slightly greater than the overall width of the elongated member 14 and from which a pair of generally L-shaped integrally formed leg portions 70, 72 extend so as to define a pair of laterally extending channels 74, 76 adjacent the opposite edges thereof. The rearwardly disposed flange portions of each of these leg members are designed to be received within the respective longitudinally extending grooves 30, 32 provided on the rear surface 36 of the elongated member 14 and accordingly are provided with a thickness approximately equal to the depth of the respective grooves 30, 32. A relatively small opening is provided intermediate the length of one channel, the opening extending outwardly through the edge portion of the slide member. A second opening is also provided extending into the channel disposed immediately below the first opening and also extends outwardly through the end portion of the slide member. Extending between and separating these two openings is an abutment portion having a generally arcuately shaped outwardly facing surface provided thereon.

In order to maintain the slide member 20 in any desired position along the length of the longitudinal member 14, a suitable spring biasing member 78 is provided which is seated at least in part within channel 74. As best seen with reference to FIGS. 6 and 9, leg portion 70 includes a relatively small opening 80 approximately intermediate the length thereof and opening outwardly from channel 74 through the edge portion of slide member 20 as well as rearwardly through leg portion 70. A second similarly sized opening 82 is also provided opening outwardly through edge portion from channel 74 and spaced slightly from opening 80. A generally arcuate shaped abutment portion 84 is provided between these openings and provides a seat against which the relatively tightly radiused center portion 86 of spring 78 bears. Each of the oppositely extending reversely and gently radiused leg portions 88, 90 of spring 78 will be received with channel 74 and present a convex surface portion which will bear against the longitudinal edge surface of elongated member 14. In order to avoid excessive spring pressure and to insure free movement of slide member 20 along elongated member 14, it has been found desirable to provide a relatively sharp approximately 90° bend at points 92, 94 between the inner ends of each of the leg portions 88 and 90 and center portion 86. Thus, the opposite arm portions of the spring member will operate to maintain a sufficient frictional engagement therewith to prevent undesired slippage of the slide member 20 with respect to the elongated member 14 yet still allow free and easy adjustment thereof.

It should be noted that channel 74 is slightly deeper than channel 76 so as to provide additional clearance space to accommodate spring 78 yet still enable the flange portion to engage elongated recess 30 of elongated member 14.

In order to utilize the segment height measuring device of the present invention, the upper clamping member 16 will first be released by loosening of threaded stud 58. Thereafter, the lower clamping member 18 will be placed over the lowest edge portion of the eyeglass frames with the lower surface thereof bearing against friction surface 46. Next, the upper clamping member 16 will be slid downwardly along elongated member 14 to bring friction surface 54 thereof into engagement with the top edge portion of the eyeglass frames. Threaded stud 58 will then be tightened to secure clamping member 16 in position so as to thus securely retain the measuring device to the eyeglass frames. Thereafter, the slide member may be positioned while the patient is wearing the eyeglasses and the proper measurement read directly from the indicia provided on the elongated member 14. It should be noted that in determining the height of the segment line, the point of reference for all such measurements will be the lowermost edge of the lenses. Accordingly, in order to enable the device of the present invention to be utilized with both frame and frameless eyeglasses, the zero point for the indicia may be placed approximately 1 mm above the friction surface 46 of the lower clamping member. Such a positioning of this zero point of the indicia scale will provide a compromise measurement for both frame and frameless eyeglasses well within acceptable levels of error and will eliminate the need for separate measuring devices for these different types of eyeglasses. Alternatively, of course, separate devices could be fabricated to overcome this potential problem.

Thus, as may now be appreciated, the present invention provides a relatively lightweight, easily used, accurate segment height measuring device that may be easily fabricated from a wide variety of polymeric compositions. The use of polymeric compositions not only contributes to the light weight of the device but contributes significantly to the ease of fabrication thereof.

While it will be apparent that the preferred embodiment of the invention disclosed is well calculated to provide the advantages and features above stated, it will be appreciated that the invention is susceptible to modification, variation and change without departing from the proper scope or fair meaning of the subjected claims.

We claim:

1. A segment height measuring device comprising:
an elongated member having measuring indicia provided on a surfsace thereof;
means for removably securing said elongated member on a pair of eyeglasses said securing means including means movable along said elongated member and securable thereto at any point there along within a given range; and
slide means movably secured to said elongated member in overlying relationship thereto, said slide means cooperating with said indicia to provide a measurement for the positioning of said segment height from the lowermost edge of said eyeglasses.

2. A segment height measuring device as set forth in claim 1 wherein said means for removably securing said elongated member on said eyeglasses includes means for engaging the upper and lower peripheral edges of said eyeglasses one of said engaging means being said moveable means.

3. A segment height measuring device as set forth in claim 2 wherein said elongated member includes a longitudinally extending slot and said movable means includes releasable clamp means extending through said slot and operative to clamp said one of said engaging means in position with respect to said elongated member.

4. A segment height measuring device as set forth in claim 2 wherein the other of said means for engaging the peripheral edges of said eyeglasses is integrally formed with said elongated member.

5. A segment height measuring device as set forth in claim 4 wherein said one and said other engaging means include a friction enhancing surface thereon operative to aid in securing said measuring device to said eyeglasses.

6. A segment height measuring device as set forth in claim 1 wherein said elongated member and slide means are transparent and of contrasting color.

7. A segment height measuring device as set forth in claim 6 wherein said device is fabricated from a polymeric composition.

8. A segment height measuring device as set forth in claim 1 wherein said slide means includes means for slightly restricting free movement between said slide means and said elongated member.

9. A segment height measuring device as set forth in claim 8 wherein said restricting means comprise spring biasing means provided thereon.

10. A segment height measuring device comprising:
an elongated member having measuring indicia provided on a surface thereof;
means for removably securing said elongated member on a pair of eyeglasses; and
slide means movably supported in overlying relationship on said elongated member, said slide means including means defining channels along opposite lateral edges thereof, said channels being adapted to receive lateral edge portions of said elongated member, said slide means cooperating with said indicia to provide a measurement for the positioning of said segment height from the lowermost edge of said eyeglasses.

11. A segment height measuring device as set forth in claim 10 wherein said slide means includes spring means disposed in part within one of said channels and operative to slidingly engage one of said edge portions to restrict free movement between said slide means and said elongated member.

12. A segment height measuring device as set forth in claim 11 wherein said spring means comprises an elongated leaf spring.

13. A segment height measuring device as set forth in claim 12 wherein said leaf spring includes a pair of arm portions disposed within said one of said channels and a center portion extending outwardly of said one of said channels intermediate the ends thereof, said center portion being operative to retain said spring in assembled relationship with said slide means.

* * * * *